United States Patent
Nakanishi et al.

[11] 3,879,392
[45] Apr. 22, 1975

[54] PYRIDO(4,3-C)PYRIDAZINE COMPOUNDS

[75] Inventors: Michio Nakanishi, Oita; Katsuo Arimura, Fukuoka; Tatsumi Tsumagari, Oita, all of Japan

[73] Assignee: Yoshitomi Pharmaceutical Industries, Ltd., Osaka, Japan

[22] Filed: Jan. 5, 1973

[21] Appl. No.: 321,424

[30] Foreign Application Priority Data
Jan. 18, 1972  Japan.................................. 47-7378

[52] U.S. Cl.... 260/250 AC; 260/240 K; 260/247.1 L; 260/247.2 A; 260/268 BC; 424/250; 424/263; 424/267; 424/248
[51] Int. Cl............................................ C07d 51/04
[58] Field of Search.................. 260/250 A, 250 AC

[56] References Cited
UNITED STATES PATENTS
3,733,328   5/1973   Hoehn .............................. 260/293.6
FOREIGN PATENTS OR APPLICATIONS
48-76895   10/1973   Japan.............................. 260/250 A OTHER PUBLICATIONS
Wait, Journal of Molecular Spectroscopy, 19(1), 25–33 (1966), Chemical Abstract 64: 9073c (original will be sent when available).
Atkinsen and Biddle, J. Chem. Soc., c, 1966 (22), 2053–2054, Chemical Abstract 66: 2524z.
Kochler, M., Journal of Heterocyclic Chem., 6(6), 977–978 (1969), Current Abstracts of Chemistry, Vol. 36 (330), 1970, p. 134090.

*Primary Examiner*—Alton D. Rollins
*Assistant Examiner*—Ralph D. McCloud
*Attorney, Agent, or Firm*—Sughrue, Rothwell, Mion, Zinn & Macpeak

[57] ABSTRACT

Pyrido[4,3-c]pyridazine compounds of the general formula:

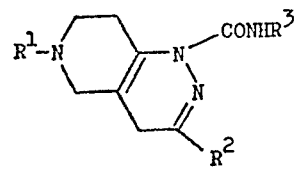

wherein $R^1$ is H, $C_{1-4}$ alkyl, $C_{2-4}$ alkenyl, $C_{2-4}$ alkynyl, aralkyl, arylalkenyl, aroylalkyl, $C_{1-4}$ alkanoyl, arylalkenylcarbonyl, aroyl, $C_{1-4}$ alkoxycarbonyl, benzyloxycarbonyl, pyridylalkyl, thenyl, aminoalkyl or 1,4-benzodioxan-2-ylmethyl; $R^2$ is $C_{1-4}$ alkyl, aryl, pyridyl or thienyl and $R^3$ is H, $C_{1-4}$ alkyl or aryl; and pharmaceutically acceptable acid addition salts thereof are useful as psychotropic agents.

10 Claims, No Drawings

PYRIDO(4,3-C)PYRIDAZINE COMPOUNDS

This invention relates to novel and therapeutically valuable pyrido[4,3-c]pyridazine compounds of the general formula:

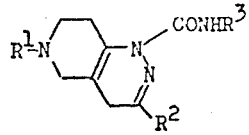  [I]

and pharmaceutically acceptable acid addition salts thereof, wherein $R^1$ is H, $C_{1-4}$ alkyl (e.g. methyl, ethyl, propyl or butyl), $C_{2-4}$ alkenyl (e.g. vinyl or allyl), $C_{2-4}$ alkynyl (e.g. 2-propynyl), aralkyl (e.g. benzyl or phenethyl), substituted aralkyl having up to three substituents which are selected from the group consisting of halogen (e.g. F, Cl or Br), $C_{1-4}$ alkyl, $C_{1-4}$ alkoxy, hydroxy, trifluoromethyl and nitro, arylalkenyl (e.g. cinnamyl), aroylalkyl which may be substituted by halogen (e.g. phenacyl, chlorophenacyl, benzoylpropyl or fluorobenzoylpropyl), $C_{1-4}$ alkanoyl (e.g. acetyl or propionyl), arylalkenylcarbonyl (e.g. cinnamoyl), aroyl (e.g. benzoyl), substituted aroyl having up to three substituents which are selected from the group consisting of halogen, $C_{1-4}$ alkyl, $C_{1-4}$ alkoxy, hydroxy, trifluoromethyl and nitro, $C_{1-4}$ alkoxycarbonyl (e.g. methoxycarbonyl, ethoxycarbonyl or isobutoxycarbonyl), benzyloxycarbonyl, pyridylalkyl, thenyl, aminoalkyl (e.g. dimethylaminoethyl, diethylaminoethyl, dimethylaminopropyl or dibenzylaminoethyl) or 1,4-benzodioxan-2-yl-methyl; $R^2$ is $C_{1-4}$ alkyl (e.g. methyl, ethyl, propyl or butyl), aryl (e.g. phenyl or naphthyl), substituted aryl having up to three substituents which are selected from the group consisting of halogen, $C_{1-4}$ alkyl, $C_{1-4}$ alkoxy, $C_{1-4}$ alkylthio, hydroxy, cyano, nitro, acetyl, alkoxycarbonyl, alkylsulfonyl, amino, acetylamino, phenyl, alkanoyloxy, trifluoromethyl, piperidino, morpholino, 4-methyl-1-piperazinyl, pyridyl and thienyl and $R^3$ is H, $C_{1-4}$ alkyl or aryl (e.g. phenyl or naphthyl). They are useful as psychotropic agents.

The compounds of general formula I can be produced, for example, by the reaction of a compound of the general formula:

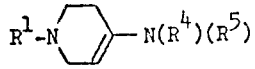  [II]

wherein $R^1$ is defined as above, $N(R^4)(R^5)$ is dialkylamino or heterocyclic group (e.g. morpholino, piperidino or 1-pyrrolidinyl), with a compound of the general formula:

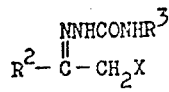  [III]

wherein $R^2$ and $R^3$ are defined as above, X is a reactive atom or group such as halogen, methylsulfonyloxy or p-tolylsulfonyloxy.

The reaction may be carried out in an inert solvent such as alcohol, ether, amide, halogenated hydrocarbon or aromatic hydrocarbon, by stirring at room temperature or elevated temperature, advantageously at a temperature near the boiling point of the solvent for several hours.

While a compound of the general formula:

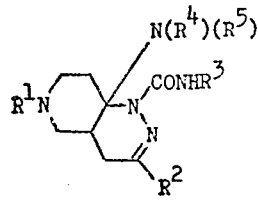  [IV]

or

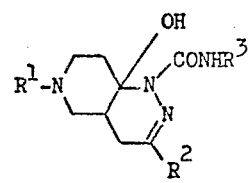  [V]

is produced as by-product in the reaction, the yield ratio of the compound IV or V to the compound I varying depending on the reaction conditions, the compound IV and V can each be converted into the compound I by treatment with an acid (e.g. hydrochloric acid).

The starting compounds of formula II can be prepared, for example, by the reaction of a 4-oxopiperidine compound with a secondary amine in a conventional manner. The compounds of formula II may be used with or without isolation and purification.

The compounds of formula I can be converted into the corresponding acid addition salts in a conventional manner by treatment with various inorganic and organic acids, for example, hydrochloric, hydrobromic, sulfuric, nitric, oxalic, fumaric, maleic, tartaric and citric acid.

The compounds of formula I and pharmaceutically acceptable acid addition salts thereof are excellent in anticonvulsant effect and suppression of spontaneous locomotor activity as shown, for example, by the following tests.

i. Anticonvulsant effect

The test compound was intraperitoneally or orally administered to one group of 5 dd-strain male mice each weighing 20–25 g. After an hour, a silver electrode of an electroshock seizure apparatus [designed by L. A. Woodbury et al. see, Archives Internationales de Pharmacodynamie et de Therapie, vol. 42, pp. 72–102 (1952)] was brought into contact with the cornea and an alternating current (2000 volts, 12.5 milliamperes) was applied for 0.2 second to induce convulsion. The $ED_{50}$, the dose required to lower the seizure rate by 50% against the control mice, was determined from the dose-effect correlation curve.

ii. Suppression of Spontaneous locomotor activity

Suppression of spontaneous locomotor activity was measured by the Photocell method described by P. B. Dews in "British Journal of Pharmacology" vol. 8, p. 46 ff. (1953). The procedure was as follows:

Each group consisting of five male mice (dd-strain mice weighing 20 to 25 g) was kept in a compartment. Forty minutes after the intraperitoneal administration of the test compounds, the spontaneous motility was counted for 20 minutes. The $ED_{50}$ shows the dose required for 50% suppression of spontaneous motility.

iii. Acute toxity

The test compound was administered intraperitoneally or orally to dd-strain mice (20–25 g body weight). The $LD_{50}$ was calculated from the lethal rate within two days after administration of the test compound.

Results:

| Compound | Anticonvulsant effect, $ED_{50}$ mg/kg |
|---|---|
| A | 6.5 (p.o.) |
| B | 13.3 (p.o.) |
| C | 26.9 (p.o.) |
| D | 11.0 (i.p.) |
| E | 27.0 (p.o.) |
| Diphenylhydantoin | 17.8 (p.o.) |

| Compound | Suppression of spontaneous locomotor activity, $ED_{50}$ mg/kg (intraperitoneal) |
|---|---|
| A | 8 |
| B | 0.6 |
| C | 15 |
| D | 10 |
| E | >80 |
| Diphenylhydantoin | >160 |

| Compound | Acute toxity, $LD_{50}$ mg/kg | |
|---|---|---|
| | (i.p.) | (p.o.) |
| A | >160 | >640 |
| B | 170 | 620 |
| C | >160 | >640 |
| D | >160 | >640 |
| E | >160 | >640 |
| Diphenylhydantoin | >160 | 500 |

Compounds A to E are identified below:

A: 6-benzyl-1-carbamoyl-3-p-chlorophenyl-1,4,5,6,7,8-hexahydropyrido-[4,3-c]pyridazine maleate, B: 6-benzyl-1-carbamoyl-3-p-nitrophenyl-1,4,5,6,7,8-hexahydropyrido-[4,3-c]pyridazine maleate, C: 1-carbamoyl-3-p-chlorophenyl-6-phenethyl-1,4,5,6,7,8-hexahydropyrido-[4,3-c]pyridazine maleate, D: 1-carbamoyl-3-p-chlorophenyl-6-p-methoxybenzyl-1,4,5,6,7,8-hexahydro-pyrido [4,3-c]pyridazine maleate, E: 6-benzyl-1-carbamoyl-3-(3,4-dichlorophenyl)-1,4,5,6,7,8-hexahydro-pyrido[4,3-c]pyridazine maleate.

In view of various tests, including those mentioned above, the compounds represented by formula I and pharmaceutically acceptable acid addition salts thereof can be safely administered as psychotropic agents for the treatment of various epilepsies (e.g. grand mal, petit mal, psychomotor seizure), neurosis and psychosomatic disease, in the form of a pharmaceutical preparation with a suitable and conventional pharmaceutically acceptable carrier or adjuvant, administrable orally, without harm to the patients.

The pharmaceutical preparations can take any conventional form such as tablets, capsules or powders.

Formulation Example 25 mg tablets are prepared from the following compositions:
```
Compound [I]              25 mg
Microcrystalline cellulose 10
Lactose                   100
Starch                     40
Methyl Cellulose            1
Talc                        3
Magnesium Stearate          1
                         180 mg
```

The daily dose of compound I or a salt thereof for human adults usually ranges from about 75 to 150 mg, in single or multiple dose, but it may be changed depending upon the age and/or symptoms of the patients.

The present invention will be better understood from the following examples which are illustrative and not limitative of the present invention.

EXAMPLE 1

A mixture of 18.9 g of 1-benzyl-4-oxopiperidine, 11 g of pyrrolidine and 200 ml of benzene is refluxed in a flask connected with a water-removing adaptor for 4 hours. The reaction mixture is concentrated under reduced pressure, and 50 ml of benzene is added. The mixture is concentrated again under reduced pressure to remove excess pyrrolidine. The residue is dissolved in 200 ml of chloroform. To the solution is added 2 5 g of phenacyl bromide semicarbazone under ice cooling. The mixture is stirred at room temperature for an hour, and then refluxed for 2 hours. After cooling, the reaction mixture is washed with water and dried over anhydrous magnesium sulfate, and the solvent is distilled off under reduced pressure. Isopropyl alcohol is added to the reddish brown residue to cause crystallization. The crystals (first crop) are filtered off. The filtrate is reserved for further treatment. The crystals are recrystallized from isopropyl alcohol to give 13 g of yellowish white crystals of 6-benzyl-1-carbamoyl-3-phenyl-1,4,5,6,7,8-hexahydropyrido[4,3-c]pyridazine melting at 177°–179°C. The corresponding maleate melts at 181°–183°C. The above mentioned filtrate is chromatographed on silica gel. The fractions eluted with chloroformmethanol (100:1) are concentrated to give 3.1 g of 8-benzyl-2-carbamoyl-1-hydroxy-4-phenyl-2,3,8-triazabicyclo[4,4,0]dec-3-ene as white crystals, melting at 165°–167°C (from isopropyl alcohol). An additional 2 g of the objective compound is obtained from the fraction developed with chloroform-methanol (50:1).

EXAMPLE 2

To a solution of 12 g of 1-benzyl-4-pyrrolidinyl-1,2,5,6-tetrahydropyridine in 200 ml of chloroform is added 15 g of p-chlorophenacyl bromide semicarbazone under ice cooling. The mixture is allowed to stand at room temperature for an hour, and then refluxed for 4 hours. After cooling, the reaction mixture is washed with water, and diluted hydrochloric acid is added to yield a precipitate. To the precipitate is added chloroform and water, and the mixture is alkalified with sodium carbonate. The chloroform layer is washed with water and dried over anhydrous magnesium sulfate. The solvent is distilled off, and to the resulting residue is added isopropyl alcohol. The crystals thus yielded are recrystallized from a mixture of isopropyl alcohol and chloroform to give 8.5 g of white crystals of 6-benzyl-1-carbamoyl-3-p-chlorophenyl-1,4,5,6,7,8-hexahydropyrido[4,3-c]pyridazine melting at 208°–210°C. The corresponding hydrochloride containing one-half molecule of water of crystallization melts at 204°–206°C and the maleate melts at 200°–202°C with decomposition.

EXAMPLE 3

A mixture of 8.5 g of 1-ethoxycarbonyl-4-oxopiperidine, 8.7 g of morpholine and 200 ml of benzene is refluxed in a flask connected with a water-removing adaptor for 8 hours. The reaction mixture is concentrated under reduced pressure and 50 ml of benzene is added, and the mixture is concentrated again under reduced pressure to remove excess morpholine.

The residue is added to 200 ml of chloroform. To the mixture is added 12.8 g of phenacyl bromide semicarbazone under ice cooling. The whole mixture is allowed to stand at room temperature for an hour, and then refluxed for 2.5 hours. After cooling, the reaction mixture is washed in sequence with water, diluted hydrochloric acid and water, dried over anhydrous magnesium sulfate and then concentrated under reduced pressure. To the residue is added isopropyl alcohol to yield crystals. The crystals are recrystallized from isopropyl alcohol to give 6.5 g of white crystals of 1-carbamoyl-6-ethoxycarbonyl-3-phenyl-1,4,5,6,7,8-hexahydropyrido[4,3-c]pyridazine melting at 184°–186°C.

EXAMPLE 4

A mixture of 1.2 g of 8-benzoyl-2-carbamoyl-1-morpholino-4-phenyl-2,3,8-triazabicyclo[4,4,0]dec-3-ene, 0.6 g of p-toluenesulfonic acid, 10 ml of chloroform and 30 ml of isopropyl alcohol is refluxed for 30 minutes. After cooling, 60 ml of chloroform and 20 ml of water are added to the reaction mixture. The chloroform layer is washed with water, dried over anhydrous magnesium sulfate, and the solvent is distilled off under reduced pressure. To the pale brown residue is added a small amount of isopropyl alcohol to yield crystals. The crystals are recrystallized from isopropyl alcohol to give 0.8 g of 6-benzoyl-1-carbamoyl-3-phenyl-1,4,5,6,7,8-hexahydropyrido-[4,3-c]pyridazine melting at 215°–216°C.

Using the procedure set forth in the above examples, but substituting equivalent amounts of the appropriate starting materials, the following compounds are also produced.

5. 1-Carbamoyl-6-methyl-3-phenyl-1,4,5,6,7,8-hexahydropyrido[4,3-c]pyridazine, m.p. 220°–221°C (decomposition).

6. 6-Butyl-1-carbamoyl-3-phenyl-1,4,5,6,7,8-hexahydropyrido[4,3-c]-pyridazine, m.p. 188°–190°C.

7. 6-Butyl-1-carbamoyl-3-p-chlorophenyl-1,4,5,6,7,8-hexahydropyrido[4,3-c]pyridazine, m.p. 179°–181°C; The corresponding hydrochloride one-half hydrate, m.p. 193°–196°C (decomposition).

8. 6-Allyl-1-carbamoyl-3-p-chlorophenyl-1,4,5,6,7,8-hexahydropyrido[4,3-c]pyridazine maleate, m.p. 172°–173°C.

9. 6-Allyl-1-carbamoyl-3-phenyl-1,4,5,6,7,8-hexahydropyrido[4,3-c]pyridazine.

10. 1-Carbamoyl-3-p-chlorophenyl-6-(2-propynyl)-1,4,5,6,7,8-hexahydropyrido[4,3-c]pyridazine maleate, m.p. 165°–166°C.

11. 1-Carbamoyl-3-phenyl-6-(2-propynyl)-1,4,5,6,7,8-hexahydropyrido[4,3-c]pyridazine.

12. 6-Benzyl-1-carbamoyl-3-methyl-1,4,5,6,7,8-hexahydropyrido[4,3-c]pyridazine, m.p. 206°–208°C.

13. 6-Benzyl-1-carbamoyl-3-p-tolyl-1,4,5,6,7,8-hexahydropyrido[4,3-c]pyridazine, m.p. 202°–205°C (decomposition).

14. 6-Benzyl-1-carbamoyl-3-m-chlorophenyl-1,4,5,6,7,8-hexahydropyrido[4,3-c]pyridazine, m.p. 159°–162°C.

15. 6-Benzyl-1-carbamoyl-3-(3,4-dichlorophenyl)-1,4,5,6,7,8-hexahydropyrido[4,3-c]pyridazine hydrochloride one-half hydrate, m.p. 221°–223°C (decomposition).

16. 6-Benzyl-1-carbamoyl-3-p-bromophenyl-1,4,5,6,7,8-hexahydropyrido[4,3-c]pyridazine maleate, m.p. 202°–205°C (decomposition).

17. 6-Benzyl-1-carbamoyl-3-p-fluorophenyl-1,4,5,6,7,8-hexahydropyrido[4,3-c]pyridazine, m.p. 199°–200°C; The corresponding maleate, m.p. 174°–176°C (decomposition).

18. 6-Benzyl-1-carbamoyl-3-o-fluorophenyl-1,4,5,6,7,8-hexahydropyrido[4,3-c]pyridazine hydrochloride, m.p. 215°–217°C (decomposition).

19. 6-Benzyl-1-carbamoyl-3-m-trifluoromethylphenyl-1,4,5,6,7,8-hexahydropyrido[4,3-c]pyridazine maleate, m.p. 192°–194°C (decomposition).

20. 6-Benzyl-1-carbamoyl-3-(4-chloro-3-methylphenyl)-1,4,5,6,7,8-hexahydropyrido[4,3-c]pyridazine.

21. 6-Benzyl-1-carbamoyl-3-(3-chloro-4-methoxyphenyl)-1,4,5,6,7,8-hexahydropyrido[4,3-c]pyridazine hydrochloride one-half hydrate, m.p. 214°–215°C (decomposition).

22. 6-Benzyl-1-carbamoyl-3-p-methoxyphenyl-1,4,5,6,7,8-hexahydropyrido[4,3-c]pyridazine maleate, m.p. 203°–205°C (decomposition).

23. 6-Benzyl-1-carbamoyl-3-m-methoxyphenyl-1,4,5,6,7,8-hexahydropyrido[4,3-c]pyridazine maleate, m.p. 191°–192°C (decomposition).

24. 6-Benzyl-1-carbamoyl-3-p-methylthiophenyl-1,4,5,6,7,8-hexahydropyrido[4,3-c]pyridazine.

25. 6-Benzyl-1-carbamoyl-3-p-nitrophenyl-1,4,5,6,7,8-hexahydropyrido[4,3-c]pyridazine, m.p. 209°–210°C; The corresponding hydrochloride one-half hydrate, m.p. 191°–194°C (decomposition).

26. 6-Benzyl-1-carbamoyl-3-m-nitrophenyl-1,4,5,6,7,8-hexahydropyrido[4,3-c]pyridazine, m.p. 160°–163°C.

27. 6-Benzyl-1-carbamoyl-3-(3,4-methylenedioxyphenyl)-1,4,5,6,7,8-hexahydropyrido[4,3-c]pyridazine.

28. 6-Benzyl 1-carbamoyl-3-p-piperidinophenyl-1,4,5,6,7,8-hexahydropyrido[4,3-c]pyridazine.

29. 6-Benzyl-1-carbamoyl-3-p-morpholinophenyl-1,4,5,6,7,8-hexahydropyrido[4,3-c]pyridazine.

30. 6-Benzyl-1-carbamoyl-3-p-(4-methyl-1-piperazinyl)phenyl-1,4,5,6,7,8-hexahydropyrido[4,3-c]pyridazine.

31. 6-Benzyl-1-carbamoyl-3-p-phenylphenyl-1,4,5,6,7,8-hexahydropyrido[4,3-c]pyridazine hydrochloride mono hydrate, m.p. 173°–176°C (decomposition).

32. 6-Benzyl-1-carbamoyl-3-β-naphthyl-1,4,5,6,7,8-hexahydropyrido[4,3-c]pyridazine.

33. 6-Benzyl-1-carbamoyl-3-(4-pyridyl)-1,4,5,6,7,8-hexahydropyrido[4,3-c]pyridazine, m.p. 160°–162°C.

34. 6-Benzyl-1-carbamoyl-3-(2-thienyl)-1,4,5,6,7,8-hexahydropyrido[4,3-c]pyridazine, m.p. 184°–186°C.

35. 1-Carbamoyl-6-p-chlorobenzyl-3-phenyl-1,4,5,6,7,8-hexahydropyrido[4,3-c]pyridazine, m.p. 200°–203°C.

36. 1-Carbamoyl-6-p-chlorobenzyl-3-chlorophenyl-1,4,5,6,7,8-hexahydropyrido[4,3-c]pyridazine, m.p. 222°–225°C.

37. 1-Carbamoyl-3-p-chlorophenyl-6-p-methoxybenzyl-1,4,5,6,7,8-hexahydropyrido[4,3-c]pyridazine, m.p. 203°–205°C; The corresponding maleate, m.p. 203°–204°C (decomposition).

38. 1-Carbamoyl-3-p-chlorophenyl-6-p-nitrobenzyl-1,4,5,6,7,8-hexahydropyrido[4,3-c]pyridazine, m.p. 206°–208°C (decomposition).

39. 1-Carbamoyl-3-p-chlorophenyl-6-(3,4-dimethoxybenzyl)-1,4,5,6,7,8-hexahydropyrido[4,3-c]pyridazine, m.p. 197°–200°C; The corresponding maleate, m.p. 184°–187°C.

40. 1-Carbamoyl-3-p-chlorophenyl-6-(3,4,5-trimethoxybenzyl)-1,4,5,6,7,8-hexahydropyrido[4,3-c]pyridazine, m.p. 192°–194°C; The corresponding maleate, m.p. 202°–204°C.

41. 1-Carbamoyl-6-phenethyl-3-phenyl-1,4,5,6,7,8-hexahydropyrido[4,3-c]pyridazine, m.p. 149°–151°C (decomposition); The corresponding hydrochloride, m.p. 206°–207°C (decomposition).

42. 1-Carbamoyl-3-p-chlorophenyl-6-phenethyl-1,4,5,6,7,8-hexahydropyrido[4,3-c]pyridazine, m.p. 164°–166°C; The corresponding hydrochloride, m.p. 163°C (decomposition).

43. 1-Carbamoyl-3-p-fluorophenyl-6-phenethyl-1,4,5,6,7,8-hexahydropyrido[4,3-c]pyridazine hydrochloride mono-hydrate, m.p. 122°–125°C.

44. 1-Carbamoyl-3-p-chlorophenyl-6-phenacyl-1,4,5,6,7,8-hexahydropyrido[4,3-c]pyridazine, m.p. 188°–189°C.

45. 1-Carbamoyl-6-(3-p-fluorobenzoylpropyl)-3-phenyl-1,4,5,6,7,8-hexahydropyrido[4,3-c]pyridazine hydrochloride one-half hydrate, m.p. 128°C.

46. 1-Carbamoyl-6-(3-p-fluorobenzoylpropyl)-3-p-fluorophenyl-1,4,5,6,7,8-hexahydropyrido[4,3-c]pyridazine maleate one-half hydrate, m.p. 96°–99°C.

47. 1-Carbamoyl-6-cinnamyl-3-phenyl-1,4,5,6,7,8-hexahydropyrido[4,3-c]pyridazine.

48. 1-Carbamoyl-3-p-chlorophenyl-6-cinnamyl-1,4,5,6,7,8-hexahydropyrido[4,3-c]pyridazine maleate, m.p. 214°–215°C.

49. 1-Carbamoyl-3-p-chlorophenyl-6-ethoxycarbonyl-1,4,5,6,7,8-hexahydroprido[4,3-c]pyridazine, m.p. 211°–214°C.

50. 6-Acetyl-1-carbamoyl-3-phenyl-1,4,5,6,7,8-hexahydropyrido[4,3-c]pyridazine, m.p. 185°–187°C.

51. 1-Carbamoyl-3-phenyl-6-(3,4,5-trimethoxybenzoyl)-1,4,5,6,7,8-hexahydropyrido[4,3-c]pyridazine.

52. 1-Carbamoyl-3-p-chlorophenyl-6-(3,4,5-trimethoxybenzoyl)-1,4,5,6,7,8-hexahydropyrido[4,3-c]pyridazine, m.p. 204°–207°C.

53. 1-Carbamoyl-6-cinnamoyl-3-phenyl-1,4,5,6,7,8-hexahydropyrido[4,3-c]pyridazine.

54. 6-Benzyloxycarbonyl-1-carbamoyl-3-phenyl-1,4,5,6,7,8-hexahydropyrido[4,3-c]pyridazine, m.p. 169°–171°C.

55. 6-Benzyloxycarbonyl-1-carbamoyl-3-p-chlorophenyl-1,4,5,6,7,8-hexahydropyrido[4,3-c]pyridazine, m.p. 161°–163°C.

56. 6-Benzyloxycarbonyl-1-carbamoyl-3-p-fluorophenyl-1,4,5,6,7,8-hexahydropyrido[4,3-c]pyridazine, m.p. 159°–162°C.

57. 6-Benzyloxycarbonyl-1-carbamoyl-3-p-nitrophenyl-1,4,5,6,7,8-hexahydropyrido[4,3-c]pyridazine, m.p. 181°–183°C.

58. 6-Benzyloxycarbonyl-1-carbamoyl-3-m-trifluoromethylphenyl-1,4,5,6,7,8-hexahydropyrido[4,3-c]pyridazine, m.p. 167°–168°C.

59. 6-Benzyloxycarbonyl-1-carbamoyl-3-p-tolyl-1,4,5,6,7,8-hexahydropyrido[4,3-c]pyridazine, m.p. 189°–190°C.

60. 6-Benzyloxycarbonyl-1-carbamoyl-3-p-methoxyphenyl-1,4,5,6,7,8-hexahydropyrido[4,3-c]pyridazine, m.p. 168°–170°C.

61. 6-Benzyloxycarbonyl-1-carbamoyl-3-(3,4-dichlorophenyl)-1,4,5,6,7,8-hexahydropyrido[4,3-c]pyridazine, m.p. 186°–187°C.

62. 6-Benzyloxycarbonyl-1-carbamoyl-3-(4-pyridyl)-1,4,5,6,7,8-hexahydropyrido[4,3-c]pyridazine.

63. 6-Benzyloxycarbonyl-1-carbamoyl-3-(2-thienyl)-1,4,5,6,7,8-hexahydropyrido[4,3-c]pyridazine.

64. 1-Carbamoyl-6-(2-diethylaminoethyl)-3-phenyl-1,4,5,6,7,8-hexahydropyrido[4,3-c]pyridazine.

65. 1-Carbamoyl-3-p-chlorophenyl-6-(2-diethylaminoethyl)-1,4,5,6,7,8-hexahydropyrido[4,3-c]pyridazine dihydrochloride, m.p. 212°–214°C (decomposition).

66. 1-Carbamoyl-6-(2-dibenzylaminoethyl)-3-phenyl-1,4,5,6,7,8-hexahydropyrido[4,3-c]pyridazine.

67. 6-(1,4-Benzodioxan-2-yl-methyl)-1-carbamoyl-3-phenyl-1,4,5,6,7,8-hexahydropyrido[4,3-c]pyridazine.

68. 6-(1,4-Benzodioxan-2-yl-methyl)-1-carbamoyl-3-p-chlorophenyl-1,4,5,6,7,8-hexahydropyrido[4,3-c]pyridazine hydrochloride, m.p. 192°–194°C (decomposition).

69. 1-Carbamoyl-3-phenyl-6-(2-pyridylmethyl)-1,4,5,6,7,8-hexahydropyrido[4,3-c]pyridazine, m.p. 107°–109°C.

70. 1-Carbamoyl-3-phenyl-6-(2-thenyl)-1,4,5,6,7,8-hexahydropyrido[4,3-c]pyridazine.

71. 6-Benzyloxycarbonyl-3-phenyl-1-phenylcarbamoyl-1,4,5,6,7,8-hexahydropyrido[4,3-c]pyridazine, m.p. 150°–152°C.

72. 6-Benzyloxycarbonyl-3-p-chlorophenyl-1-methylcarbamoyl-1,4,5,6,7,8-hexahydropyrido[4,3-c]pyridazine.

73. 6-Benzyloxycarbamoyl-1-phenylcarbamoyl-3-p-chlorophenyl-1,4,5,6,7,8-hexahydropyrido[4,3-c]pyridazine.

74. 6-Benzyl-3-phenyl-1-butylcarbamoyl-1,4,5,6,7,8-hexahydropyrido[4,3-c]pyridazine.

75. 1-Carbamoyl-3-methyl-1,4,5,6,7,8-hexahydropyrido[4,3-c]pyridazine.

76. 1-Carbamoyl-3-phenyl-1,4,5,6,7,8-hexahydropyrido[4,3-c]pyridazine, m.p. 206°–207°C.

77. 1-Carbamoyl-3-p-chlorophenyl-1,4,5,6,7,8-hexahydropyrido[4,3-c]pyridazine, m.p. 200°–204°C.

78. 1-Carbamoyl-3-p-fluorophenyl-1,4,5,6,7,8-hexahydropyrido[4,3-c]pyridazine, m.p. 194°–196°C; The corresponding hydrobromide, m.p. 253°–255°C (decomposition).

79. 1-Carbamoyl-3-p-tolyl-1,4,5,6,7,8-hexahydropyrido[4,3-c]pyridazine, m.p. 138°–141°C.

80. 1-Carbamoyl-3-p-methoxyphenyl-1,4,5,6,7,8-hexahydropyrido[4,3-c]pyridazine, m.p. 127°–129°C.

81. 1-Carbamoyl-3-m-trifluoromethylphenyl-1,4,5,6,7,8-hexahydropyrido[4,3-c]pyridazine, m.p. 210°–214°C; The corresponding hydrobromide, m.p. 203°–205°C (decomposition).

82. 1-Carbamoyl-3-p-nitrophenyl-1,4,5,6,7,8-hexahydropyrido[4,3-c]pyridazine hydrobromide, m.p. 233°–236°C.

83. 1-Carbamoyl-3-(3,4-dichlorophenyl)-1,4,5,6,7,8-hexahydropyrido[4,3-c]pyridazine, m.p. 207°–210°C.

84. 1-Carbamoyl-3-(4-pyridyl)-1,4,5,6,7,8-hexahydropyrido[4,3-c]pyridazine.

85. 1-Carbamoyl-3-(2-thienyl)-1,4,5,6,7,8-hexahydropyrido[4,3-c]pyridazine.

86. 3-p-Chlorophenyl-1-methylcarbamoyl-1,4,5,6,7,8-hexahydropyrido[4,3-c]pyridazine.

87. 1-Butylcarbamoyl-3-p-chlorophenyl-1,4,5,6,7,8-hexahydropyrido[4,3-c]pyridazine.

88. 3-Phenyl-1-phenylcarbamoyl-1,4,5,6,7,8-hexahydropyrido[4,3-c]pyridazine hydrobromide, m.p. 267°–269°C (decomposition).

What is claimed is:

1. A pyrido[4,3-c]pyridazine compound of the formula:

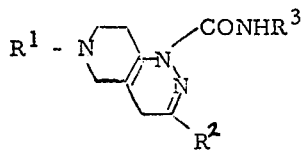

wherein $R^1$ is hydrogen, methyl, butyl, allyl, 2-propynyl, benzyl, phenethyl, p-chlorobenzyl, p-methoxybenzyl, 3,4-dimethoxybenzyl, 3,4,5-trimethoxybenzyl, p-nitrobenzyl, phenacyl, 3-p-fluorobenzoylpropyl, acetyl, benzoyl, 3,4,5-trimethoxybenzoyl, ethoxycarbonyl, benzyloxycarbonyl, 2-pyridylmethyl, 2-diethylaminoethyl or 1,4-benzodioxan-2-yl-methyl; $R^2$ is methyl, phenyl, m-chlorophenyl, p-chlorophenyl, 3,4-dichlorophenyl, p-bromophenyl, o-fluorophenyl, p-fluorophenyl, p-tolyl, m-methoxyphenyl, p-methoxyphenyl, m-tri-fluoromethylphenyl, m-nitrophenyl, p-nitrophenyl, 3-chloro-4-methoxyphenyl, p-biphenylyl, 4-pyridyl or 2-thienyl; and $R^3$ is hydrogen or phenyl; and pharmaceutically acceptable acid addition salts thereof.

2. The compound of claim 1:
6-benzyl-1-carbamoyl-3-p-chlorophenyl-1,4,5,6,7,8-hexahydropyrido[4,3-c]pyridazine.

3. The compound of claim 1:
6-benzyl-1-carbamoyl-3-p-chlorophenyl-1,4,5,6,7,8-hexahydropyrido[4,3-c]pyridazine maleate.

4. The compound of claim 1:
6-benzyl-1-carbamoyl-3-p-nitrophenyl-1,4,5,6,7,8-hexahydropyrido[4,3-c]pyridazine.

5. The compound of claim 1:
1-carbamoyl-3-p-chlorophenyl-6-phenethyl-1,4,5,6,7,8-hexahydropyrido[4,3-c]pyridazine.

6. The compound of claim 1:
1-carbamoyl-3-p-chlorophenyl-6-p-methoxybenzyl-1,4,5,6,7,8-hexahydropyrido[4,3-c]pyridazine.

7. The compound of claim 1:
6-benzyl-1-carbamoyl-3-(3,4-dichlorophenyl)-1,4,5,6,7,8-hexahydropyrido[4,3-c]pyridazine.

8. The compound of claim 1:
6-benzyl-1-carbamoyl-3o-fluorophenyl-1,4,5,6,7,8-hexahydropyrido[4,3-c]pyridazine hydrochloride.

9. The compound of claim 1:
6-benzyloxycarbonyl-3-phenyl-1-phenylcarbamoyl-1,4,5,6,7,8-hexahydropyrido[4,3-c]pyridazine.

10. The compound of claim 1:
1-carbamoyl-3-p-chlorophenyl-1,4,5,6,7,8-hexahydropyrido[4,3-c]pyridazine.

* * * * *